Nov. 24, 1964 R. S. WEBB 3,158,755
VACUUM TUBE-TRANSISTOR COUPLING CIRCUIT COUPLING DRIVE POWER
FROM VACUUM TUBE TO POWER TRANSISTOR TO LOAD
Filed Dec. 18, 1961 2 Sheets-Sheet 1
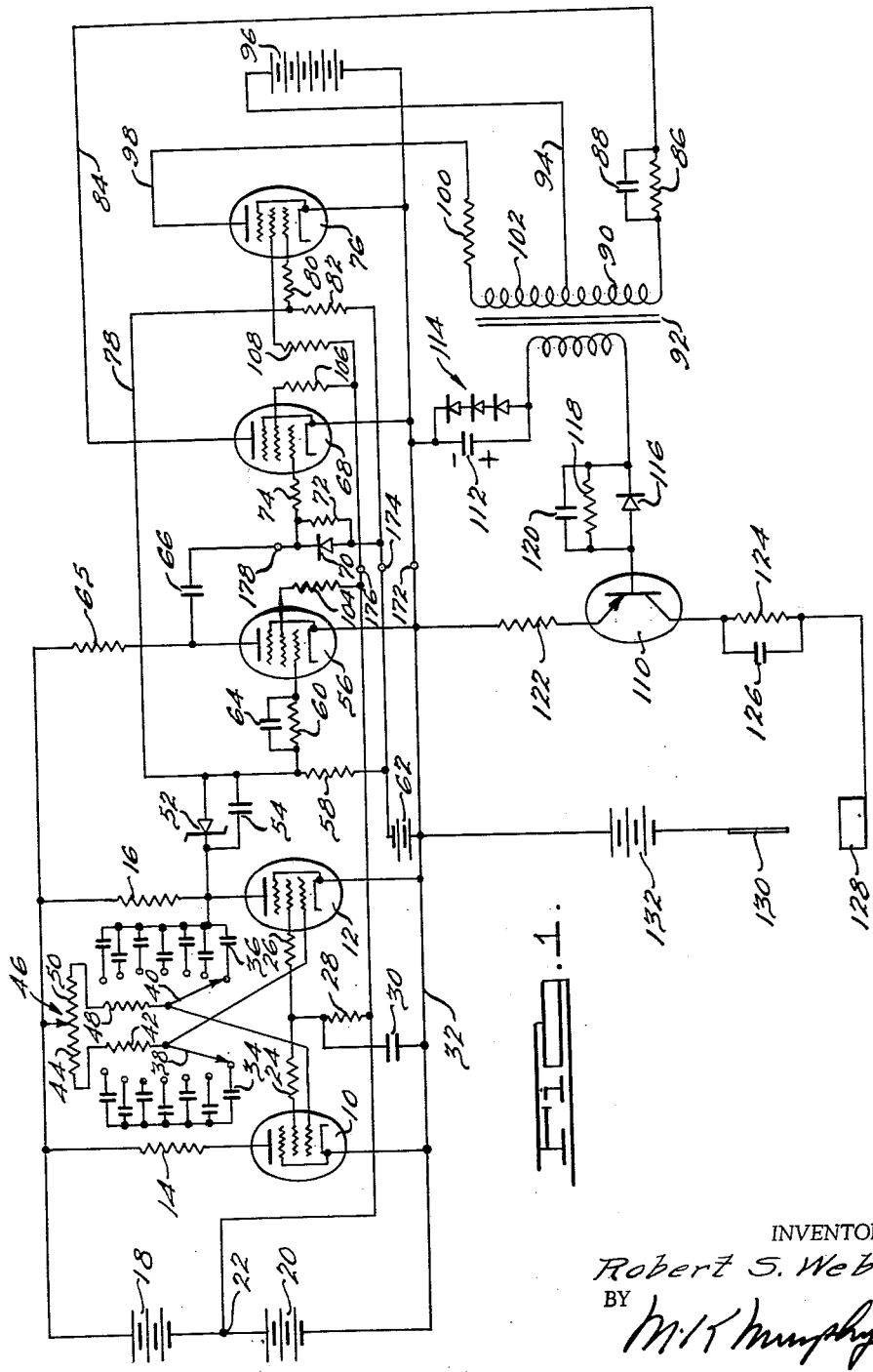
INVENTOR.
Robert S. Webb.
BY
M. K. Murphy
ATTORNEY.

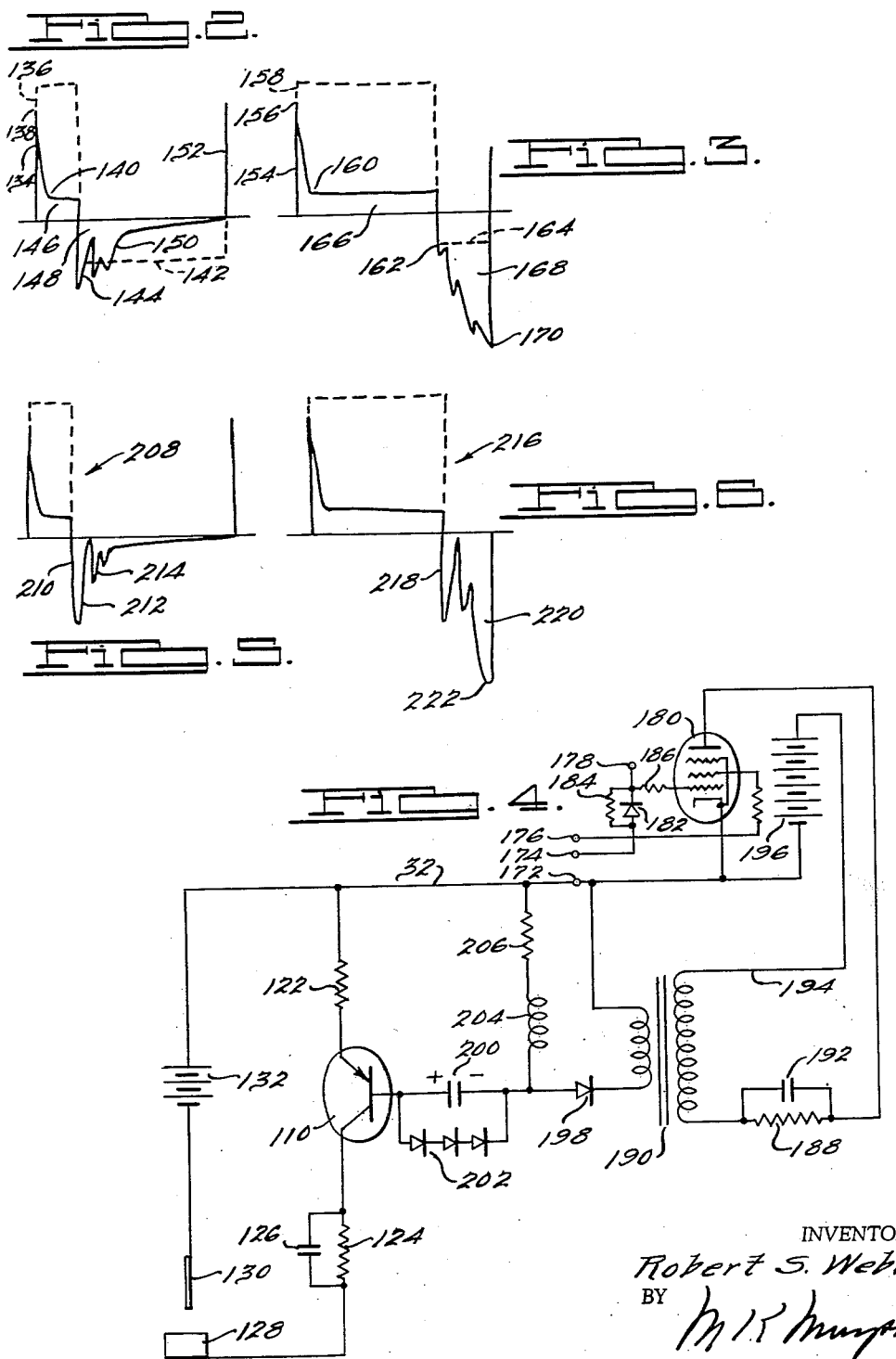

United States Patent Office  3,158,755
Patented Nov. 24, 1964

3,158,755
VACUUM TUBE-TRANSISTOR COUPLING CIRCUIT COUPLING DRIVE POWER FROM VACUUM TUBE TO POWER TRANSISTOR TO LOAD
Robert S. Webb, Bloomfield Hills, Mich.
(1830 Stephenson Highway, Troy, Mich.)
Filed Dec. 18, 1961, Ser. No. 160,156
38 Claims. (Cl. 307—88.5)

This invention relates to an interstage coupling circuit for an electronic amplifier, particularly to a network for coupling a stage of vacuum tube amplification to a common emitter transistor network.

There are a number of applications for high power electronic pulse circuitry having adjustable On-Off ratio at a particular frequency. One application for such circuitry is in an electrical discharge machining power circuit.

Electrical discharge machining, sometimes referred to in the art as EDM, spark machining, or arc machining, is carried on by passing a series of discrete, localized, extremely high current density discharges across a gap between a tool electrode and a conductive workpiece at sonic or ultrasonic frequencies in the presence of a dielectric fluid for eroding the workpiece.

In electrical discharge machining the conductive tool is usually maintained in proximate position with the workpiece by an automatic servo feed and is advanced toward or into the workpiece as stock is removed therefrom.

A fluid coolant, usually a liquid, is circulated through the working gap to flush the eroded particles from the gap and is sometimes furnished under pressure by a pump through a pattern of holes in the electrode. The defining characteristic of electrical discharge machining is that the coolant is a dielectric such as kerosene, transformer oil or pure water and is broken down in minute, localized areas by the action of the machining power supply between the closest points of the tool and work.

An example of the type of EDM power circuitry representative of the present state of the art is shown in Matulaitis and Lobur Patent No. 2,951,969, issued September 6, 1960. A machining power circuit, such as disclosed therein, when combined with a power feed of an improved type as shown in my Patent No. 2,962,630, issued November 29, 1960, results in a machine having excellent control characteristics and readily usable by machinists having mechanical skill only and no electrical or electronics background as is typical of the machining trades.

The above mentioned machining power circuit contemplates a fixed multivibrator cycle for producing a definite on-time and off-time at a particular machining tap. I have found that it is desirable to be able to vary continuously the machine on-time while maintaining a substantially constant frequency or repetition rate. This variation in on-time or duty factor can range from as little as one percent or less to eighty percent or more. A machine having these characteristics has infinitesimally adjustable machining current or machining rate thereby permitting exact adjustment to maximum efficiency machining conditions at a particular desired metal removal rate and surface finish or machining gap.

A further objection to the circuitry of Patent No. 2,951,969 is that a machining power circuit capable of extremely high current output required for high metal removal rate necessitates the use of many, sometimes thousands of vacuum tubes to produce the desired machining current. Since vacuum tubes are inherently high voltage devices, extremely high power losses result at these machining currents and expensive equipment and complex electronic circuitry is required. The cost of operation and consumption of electric power is correspondingly high. Furthermore, vacuum tubes are thermionic emissive devices and their average or rated life is approximately 1000 hours. With this limited life, it can be seen that as the number of vacuum tubes increases, the cost of the basic machine, as well as operation and maintenance becomes excessive.

Accordingly, it is the principal object of this invention to provide an improved machining power circuit, having widely adjustable on-off ratio or duty factor infinitesimally adjustable throughout the machining current range at various selected discharge repetition rates; having transistors as the electronic switch for controlling the discharge characteristics and employing an efficient coupling network for coupling a vacuum tube amplifier to a transistor amplifier.

Another object of this invention is to provide means for positively driving the transistor bank with accelerated turn On and turn Off characteristics under power.

Another object of this invention is to provide a shunt-choke network for sharply accelerating turn Off of a transistor bank driven by a wide range pulse circuit.

Still another object of this invention is to provide a simple and reliable means for providing a self developing low voltage-high current bias for maintaining the transistor bank off during periods of nonconduction.

Other objects and advantages are disclosed in the following specification which taken in conjuction with the accompanying drawings show preferred forms of apparatus for practicing the invention.

In the drawings in which reference numerals have been used to designate like parts herein referred to:

FIG. 1 shows in schematic form a pulse generating and amplifying circuit having a continuously adjustable on-off ratio at several different pulse repetition rates and the associated pulse transformer circuit for coupling the output of the vacuum tube amplifier to drive the transistor bank;

FIG. 2 shows a voltage waveform across the pulse transformer for the circuit of FIG. 1 during a relatively narrow on-time;

FIG. 3 shows a similar voltage waveform during a condition of relatively wide on-time;

FIG. 4 shows a modification of the FIG. 1 circuit including a shunt-choke network for turn off of the transistor bank;

FIG. 5 shows a voltage waveform across the pulse transformer for the circuit of FIG. 4 during a condition of narrow on-time;

FIG. 6 shows a corresponding voltage waveform across the pulse transformer of FIG. 4 during a condition of wide on-time.

Referring now to FIG. 1, the pulsating drive signal is generated by multivibrator tubes 10 and 12 connected respectively through plate load resistors 14 and 16 to the positive terminal of anode supply 18. The negative terminal of D.C. supply 18 is in turn connected to the positive terminal of supply 20. Power supplies 18 and 20 together comprise the anode power supply for the multivibrator and first stage of amplification. A tap 22 connects between supplies 18 and 20 and provides screen voltage for the various stages of pentode amplification. The screen grid of tube 10 connects through a resistor 24 to the common screen tap of the multivibrator circuit. The screen grid of tube 12 connects through a resistor 26 to the common tap which is in turn connected through a resistor 28 to screen tap 22 of the main supply. A bypass capacitor 30 connects the common junction of resistors 24, 26 and 28 to the common ground of the system which is represented by a lead 32.

Typical cross-coupling capacitors 34 and 36 are selected by frequency selector switches 38 and 40 and cross-couple the anodes of tubes 10 and 12 to the opposing grid. The control grid of tube 12 is returned to the positive terminal of the anode power supply through a limiting resistor 42 and a portion 44 of rheostat 46. The control grid of tube 10 is similarly returned through a limiting resistor 48 and portion 50 of rheostat 46; thus completing the connection of the multivibrator circuit itself.

The signal output of multivibrator tube 12 generated across resistor 16 is coupled through a reference diode 52 and shunt connected capacitor 54 to the control grid circuit of a pentode amplifier 56. The negative terminal of reference diode 52 and capacitor 54 is connected to the junction between resistors 58 and 60 as shown. Resistor 58 returns the grid of tube 56 to negative bias 62 and during periods of off-time for tube 56 maintains this tube nonconductive. Resistor 60 limits grid current during periods of on-time thus decoupling the control grid of tube 56 from the multivibrator circuit. A small capacitor 64 is connected across resistor 60 to provide sharp leading edge drive to tube 56 thereby insuring sharp switching characteristics of this tube.

The output of tube 56 is developed across a plate load resistor 65 which returns the anode of tube 56 to the anode power supply 18.

A coupling capacitor 66 couples the signal output of tube 56 to the grid of drive tube 68. The grid of tube 68 is clamped to bias 62 through a diode 70. A resistor 72 is connected in parallel with diode 70 to provide off bias for tube 68 during periods of its nonconduction. A resistor 74 limits the grid current of tube 68 in a manner similar to resistor 60 of tube 56.

The control grid of a tube 76 is returned by a lead 78 to the negative terminal of reference diode 52. A resistor 80 limits grid current from tube 76 and a resistor 82 provides a localized bias return for this tube. Amplifier tubes 68 and 76 are generally comprised of a bank of several tubes for providing sufficient drive power to successive stages.

The anode of tube 68 is connected through a lead 84 to a network comprising resistor 86 and shunt connected capacitor 88. The opposite side of this network is connected to one side of a primary 90 of drive coupling transformer 92. A lead 94 provides a center tap connection for the primary of this transformer and connects the anode circuit of tube 68 to the positive terminal of a drive power supply 96.

Tube 76 is connected to a lead 98 to a resistor 100 which returns the anode of tube 76 through a portion 102 of the primary of transformer 92, thus tubes 68 and 76 obtain anode power from D.C. supply 96 through common lead 94.

The screen grid of tube 56 is returned through a limiting resistor 104 to screen tap 22. Similarly, the screen of tube 68 is returned through a resistor 106 and the screen of tube 76 is returned through a resistor 108 to the screen tap 22 on the multivibrator anode power supply.

The secondary of transformer 92 is connected to drive a transistor bank 110 alternately conductive and nonconductive. One side of the secondary of transformer 92 is connected to the positive terminal of a network consisting of capacitor 112 and shunt connected diodes 114. The negative terminal of this network is connected to reference ground 32. The opposite side of the secondary of transformer 92 is connected through a diode 116 to the base of transistor 110. Connected in parallel with diode 116 is a resistor 118 and a capacitor 120.

In this example, transistor 110 is a PNP device and the anode of diode 116 is connected to the base of transistor 110. Diodes 114 are silicon or germanium devices and have a minimum conduction voltage of approximately .6 to .8 volt each. The cathode of this diode string is connected to the negative terminal of capacitor 112 and the number of series connected diodes in the string is chosen to determine the minimum desired bias voltage across capacitor 112.

The emitter of transistor 110 is connected through a balancing resistor 122 to reference ground lead 32. The collector of transistor 110 is connected through a power resistor bank 124 having a capacitor 126 connected in parallel therewith. The opposite end of this network is connected to a workpiece 128 in this example. Electrode 130 is maintained in spaced proximity to the workpiece as described in detail in the above mentioned patents. The electrode 130 is connected to the negative terminal of a machining power supply 132. The positive terminal of machining power supply 132 is connected to reference ground 32 thereby completing the discharge loop.

Operation of this circuit is controlled by multivibrator tubes 10 and 12. The novel grid return of this multivibrator is extremely important in a modern electrical discharge machining power circuit because of the wide range of on-off ratio or duty factor required at a particular frequency. This is achieved by returning the adjustable tap on rheostat 46 to the fixed D.C. voltage which, in this instance, is the positive terminal of anode supply 18.

As the adjustable tap is moved from side to side, a decrease in resistance 44, for example, produces a corresponding increase in resistance 50, thereby maintaining constant total grid resistance even though each grid circuit varies widely.

It is well known in multivibrator design that the operating period of a multivibrator may be represented by the formula:

$$T=K[C34(R42+R44)+C36(R48+R50)]$$

If coupling capacitors 34 and 36 are equal, the formula may be simplified to:

$$T=K_1[R42+R46+R48]$$

From this simplified formula, it may be seen that as the tap on rheostat 46 is moved from one extreme to the other, resistance is similarly moved from one grid return to the opposing return; thereby maintaining a constant frequency regardless of the position of the adjustable tap on rheostat 46, thus achieving a wide range in on-off ratio at a fixed frequency.

Except for this important grid return, the operation of multivibrator tubes 10 and 12 is well known in the electronics industry for given coupling capacitors 34 and 36. To select a different operating frequency, switches 38 and 40 which are normally ganged together as a frequency control, select different capacitors in the respective grid circuits. In this example, six frequency taps are shown. The output of multivibrator tube 12 is produced across plate load resistor 16 and is a substantially rectangular signal having a frequency determined by the composite grid circuit resistance in conjunction with capacitors 34 and 36 and a duty factor determined by the setting of the adjustable tap on rheostat 46.

Another important circuit network required to achieve this widely adjustable duty factor is the network for coupling the output of the signal from the multivibrator to successive stages of the amplifier. Analysis of this circuit will shown that multivibrator tube 12 and power transistor bank 110 are On or conductive in-phase with a discharge across the gap between electrode 130 and workpiece 128. For extremely low duty factor, insufficient power is transferred through a coupling capacitor for proper drive of successive stages of amplification and therefore an improved circuit is required to properly couple the output of the mulitvibrator to amplifier tube 56.

This improved coupling circuit is achieved through use of reference diode 52 and shunt capacitor 54 for referencing a rectangular or pulse output developed across signal resistor 16 downward as is required for proper control of the grid of amplifier tube 56. Bias return resistor 58 maintains tube 56 nonconductive during periods of nonconduction of tube 56. This is achieved as multivibrator tube 12 becomes conductive, thereby generating a voltage drop across resistor 16. A typical value for plate supply voltage 18 and 20 is approximately 250 volts total and the drop across multivibrator tube 12 during conduction is approximately 100 volts, therefore generating a signal of approximately 150 volts across resistor 16.

As long as the regulated voltage of reference diode 52 is larger than the drop across tube 12, the control grid of tube 56 will at this time be negative. In the example given, the reference diode would have a magnitude of regulation of approximately 200 volts and the control grid of tube 56 would therefore be biased to approximately minus 100 volts. Reference diode 52 and capacitor 54 form a network for producing a floating D.C. voltage having almost no capacitive losses during switching as would be encountered if a D.C. supply of normal characteristics produced from a transformer winding, rectifiers, etc., were employed at this point. The smaller shunt or leakage capacity resulting from this improved network which is floating on the anode of tube 12 to lead 32 or other circuit components, results in far less shunt losses than would occur with a conventional D.C. supply connected at this point.

As multivibrator tube 12 becomes nonconductive, the voltage signal across resistor 16 disappears, thereby carrying the reference diode circuit positive. In this example, with a 250 volt plate supply and a 200 volt reference diode, approximately 50 volts is developed across resistor 60 connected to the control grid of tube 56 since the control grid clips the signal at approximately the same voltage as the cathode of tube 56. An extremely small lead capacitor 64 is connected across resistor 60 for improving the sharp rise and fall characteristics of this signal, thereby causing amplifier 56 to both amplify and resquare the signal as well as decouple the multivibrator from successive stages of amplification.

Rectangular pulsating signal of amplified power is therefore generated across load resistor 65 connected in the anode circuit of tube 56 and is coupled through capacitor 66 to the control grid circuit of tube 68. Diode 70 clamps this pulsating signal to bias 62 and resistor 74 and limits grid current during periods of conduction of tube 68 since the signal developed across resistor 72 is in excess of the bias voltage 62.

Generally the off-time or duration between pulses of the output transistor bank is at least twenty percent of the total signal. In other words, the maximum duty factor is approximately eighty percent compared to a minimum duty factor of approximately one percent. Since tube 56 is therefore conductive for at least twenty percent of the cycle, sufficient power is transferred through coupling capacitor 66 to drive the control grid of tube 68 and a normal coupling circuit may be employed in the control grid circuit of tube 68.

The control grid circuit of tube 76 is driven by the same source of signal as tube 56 and is therefore connected to the reference diode network 52, 54 by lead 78. The drive characteristics of this tube are quite similar to that of tube 56 except that a number of tubes may be employed in parallel in place of tube 76.

Power tube bank 68 is driven On or conductive in-phase with conduction of power transistor 110. Electron flow during drive of transistor 110 is from lead 32 through tube 68 to anode lead 84. During the instant of turn On, electron flow passes through capacitor 88 since there is zero voltage across capacitor 88 at the instant of turn On. Primary 90 of transformer 92 completes the circuit to the positive terminal of drive power supply 96 thus completing the power circuit of tube 68.

Electron flow in primary 90 of transformer 92 produces a corresponding electron flow in the secondary of transformer 92 causing drive current to transistor 110 to flow through diode 116, the base-emitter of transistor 110, balancing resistor 122, bias capacitor 112 to the positive terminal of the secondary winding. During this condition of forward drive to transistor 110, excess voltage across capacitor 112 is limited by the shunt diode network as described above to approximately 2 volts in this example.

Drive current causes transistor 110 to become conductive. If the gap between workpiece 128 and electrode 130 is sufficiently small to permit a gap discharge, electron flow occurs from the negative terminal of discharge power supply 132, electrode 130, workpiece 128, resistor 124, collector-emitter of transistor 110, balancing resistor 122 to the positive terminal of supply 132. Capacitor 126 is provided in shunt with resistor 124 to provide accelerated turn On of the discharge gap. The charging time of this capacitor is selected to be small with respect to the total period of conduction of transistor 110 and is permitted to discharge substantially between pulses.

After a period of conduction of transistor 110, the transistor bank is driven off under power by conduction of tube bank 76. Turn Off electron flow occurs in the primary circuit of transformer 92 from lead 32, tube 76, lead 98, limiting resistor 100, primary 102, lead 94 to the positive terminal of drive power supply 96. Conduction of electron flow in this winding is of opposite phasing and causes a reverse current flow in the secondary of transformer 92. During the period of turn Off, electron flow occurs from the secondary of transformer 92 through capacitor 112, balancing resistor 122, emitter-base of transistor 110, capacitor 120, to the opposite side of the secondary of transformer 92. After transistor 110 becomes nonconductive, the emitter-base junction blocks in this polarity and retards further current flow. If this transistor is an alloy junction device or other type having a high reverse voltage rating between emitter and base, electron flow does not continue except for the minute amounts resulting from reverse leakage of the junction. Typical transistors employed in this bank, however, are the diffused junction type and are of such construction that a relatively low voltage in reverse across the base-emitter junction causes reverse conduction. The magnitude of such reverse conduction is limited by resistor 118 since electron flow is blocked by diode 116 and is limited to a value that is safe or non-damaging to transistor 110 and nonsaturating to transformer 92.

Regardless of transistor type, this drive circuit, particularly drive transformer 92 and the current limiting networks, is subject to particular consideration. As mentioned above, the duty factor at a particular frequency can vary widely and in a typical advanced machining circuit will vary from a minimum of approximately 1 percent duty factor at a particular frequency to a maximum of approximately 80 or 90 percent duty factor or conduction period of the machining cycle. A transformer, on the other hand, is an A.C. device in which the positive voltage area of either secondary or primary must exactly equal the negative voltage area. It is therefore virtually impossible and certainly impractical to operate transformer 92 in push-pull without saturating its iron core during periods of narrow on-time regardless of the type of transistor utilized; and proper circuit design is required to prevent saturation during periods of wide on-time when the transformer is used to drive a diffused junction transistor having extremely low emitter-base reverse voltage limit.

Operation of this circuit during these extreme conditions is best shown by comparing FIGS. 2 and 3. FIG. 2 shows a condition of narrow on-time and FIG. 3 shows a condition of relatively wide on-time. The forward or drive voltage resulting from conduction of tube 68 is shown in FIG. 2 as rising along line 134. If the secondary of transformer 92 were open circuited, the voltage would rise to magnitude 136 and the turns ratio is designed to permit this maximum voltage condition for accelerated turn On of the transistor by breakdown of the uncoupled circuit inductance which inherently results from all lead lengths in the primary and secondary, the uncoupled inductance of the transformer and other unavoidable series inductance in the components themselves. As conduction occurs through the series inductance and through the transistor, the resulting maximum voltage across the transformer is shown as magnitude 138. After the delay time of this series inductance and the breakdown of the transistor into a conducting condition, the voltage falls rapidly to 140 and thereafter remains constant during the period of conduction. This magnitude of conduction voltage is the total of the series drop due to circuit resistance, diode 116, the base-emitter junction of transistor 110 and the voltage across capacitor 112.

At the instant of turn Off, tube 68 is rendered nonconductive and tube 76 is rendered conductive, causing the voltage across transformer 92 to reverse. There are normally fewer tubes in bank 76 than 68 and more turns on winding 102 than winding 90 such that the maximum reverse voltage represented by imaginary line 142 is lower in magnitude than forward voltage 136. Reverse voltage is developed under power to magnitude 142 and upon blocking of the emitter-base junction of transistor 110, an oscillation occurs about this voltage magnitude caused by ringing of the stray capacity of this circuit and of the transistor junction itself. This oscillation shown at 144 does not affect operation of the circuit, however, since the transistor is biased Off during this period.

The positive area under the curve corresponding to a condition of forward drive is represented by area 146 and results from conduction of tube 68. The negative area of the transformer voltage waveform curve is shown as area 148 and occurs during conduction of tube 76. Areas 146 and 148 are of course equal. Tube 76 conducts during the entire negative portion of the waveform and the transformer saturates during this negative portion of the wave causing the voltage to fall along line 150. Saturating the transformer in this polarity is nondamaging since the total circuit current flow is limited by primary resistor 100 connected in series with tube 76. Conduction of tube 76 during the entire negative portion of the wave prevents any oscillation or runaway condition of the transformer voltage which might result in a positive voltage during the off-time. As the secondary voltage falls along line 150, the bias stored across capacitor 112 maintains transistor 110 nonconductive for the balance of the period of nonconduction until the next forward voltage pulse represented by line 152 occurs. Thus the transistor is turned Off under power from tube bank 76 and immediately after turn Off is maintained nonconductive by the bias across capacitor 112.

FIG. 3 shows a condition of long on-time or high duty factor in which the voltage rises along line 154. Magnitudes 156 and 158 are identical respectively to magnitudes 138 and 136 and after leading edge breakdown into conduction falls to point 160 which corresponds to voltage 140 of FIG. 2. Upon turn Off of the forward drive pulse, caused by conduction of tube 68, the drive voltage is carried under power by tube 76 to point 162. An imaginary line is shown at 164 and corresponds to 142 of FIG. 2, representing the maximum transformer voltage caused by conduction of tube 76. The positive area of 166 is likewise equal to the negative area 168 and for this condition of long on-time, results in the induced negative voltage being higher in magnitude than the conduction level of tube 76 and the portion of the negative area below line 164 is caused by the normal flyback action of the transformer. Nevertheless, the transformer is carried under power to point 162 sharply turning Off the transistor bank. As outlined above, the base-emitter junction then blocks and places no load on the transformer at this time.

If transistor 110 is of the alloy junction type, diode 116 resistor 118 and capacitor 120 may be omitted since the transistor junction would be capable of withstanding the higher voltage magnitude shown at 170. If transistor 110 is of the diffused alloy type having a lower base to emitter rating, these components must be included to limit reverse current through the transistor during this off-time and to prevent saturation of the transformer during the forward or drive voltage condition. In this case, capacitor 120 is chosen to permit sufficient reverse surge of power to completely turn Off the transistor under power and resistor 118 is chosen to have as high an ohmic resistance as possible while insuring positive off bias of the transistor bank. It is necessary to design the maximum voltage output of tube 76 across winding 102 to the maximum reverse voltage 170 if appreciable current flows through resistor 118 during off-time. This is required so that the forward voltage along line 160 does not saturate under wide on-time conditions thus resulting in loss of drive. During this condition of relatively long on-time, the bias stored across capacitor 112 is ineffective since the voltage across the transformer secondary is sufficient to maintain off bias of the transistor.

FIG. 4 shows a modification of the FIG. 1 circuitry having a somewhat different drive network. The discharge power loop and transistor 110 are identical to that shown in FIG. 1 and all components shown in the discharge loop including components 122 through 132 are the same as those shown in FIG. 1. The multivibrator and first stage of amplification are also the same as in FIG. 1 and would be connected at terminals 172, 174, 176 and 178, as indicated in FIGS. 1 and 4.

Vacuum tube drive power bank 180 is similar in function to tube bank 68 of FIG. 1 but consists of more tubes connected in parallel. Diode 182 is similar in function to diode 70 and serves to clamp drive signal to bias 62 at point 174. Resistors 184 and 186 serve similar functions to resistors 72 and 74 of FIG. 1. The anode of tube 180 is connected through resistor 188 to one side of the single primary of drive transformer 190. A lead capacitor 192 is connected in parallel with resistor 188. The opposite side of the primary winding of transformer 190 is connected through lead 194 to the positive terminal of drive power supply 196.

One side of the secondary of transformer 190 is connected to reference ground 32. The opposite side of the secondary of transformer 190 is connected through diode 198 to the negative terminal of capacitor 200. A series diode network 202 is connected across capacitor 200 with the cathode of the diode network on the negative terminal of the capacitor. The common positive junction of capacitor 200 and diode network 202 is connected to the base of transistor bank 110. One lead of the choke 204 is connected to the junction between capacitor 200 and diode 198. The opposite end of choke 204 is connected through a resistor 206 to reference ground 32, thus completing the drive loop for transistor 110.

Operation of the circuit of FIG. 4 is such that forward drive current to transistor 110 is caused by conduction of tube 180 in a manner similar to the circuitry of FIG. 1. Conduction of drive electron flow in the primary circuit occurs from the negative terminal of supply 196 through common ground 32, tube 180, network 188–192, primary of transformer 190, lead 194, to the positive terminal of supply 196. Capacitor 192 serves to accelerate conduction of current flow and turn On of transistor 110 by bypassing resistor 188 at the instant of turn On. Electron flow occurs in the secondary circuit from the secondary of transformer 190 through diode 198, capacitor 200, base-emitter of transistor 110, balancing resistor 122, reference ground 32, to the opposite side of the secondary of transformer 190.

After the initial delay period determined by the time constant of choke 204, a shunt electron flow occurs through choke 204 and resistor 206. Bias capacitor 200 is similar in function to capacitor 112 of FIG. 1 and diode network 202 serves to limit the voltage across capacitor 200 just as diodes 114 limit the voltage across capacitor 112 in FIG. 1.

In the circuitry of FIG. 4, the shunt network consisting of choke 204 and resistor 206 serves to accelerate turn Off of transistor 110. As tube bank 180 is rendered sharply nonconductive, the voltage across the secondary of transformer 190 tends to reverse. At the same instant, the electron flow through choke 204 is sustained by the induction of that choke and causes a turn Off electron flow through the transistor bank through resistor 206, resistor 122, emitter-base of transistor 110 and bias capacitor 200. Thus transistor 110 is turn Off under power by the inductive surge of inductance 204.

After the decay of current of inductance 204, as determined by its time constant, transistor 110 is maintained nonconductive by the bias stored across capacitor 200. The flyback voltage of the secondary of transformer 190 is blocked from the circuit by rectifier 198 and discharge of capacitor 200 through the secondary winding is similarly blocked by diode 198; thus insuring pulse operation of transformer 190.

Operation of the circuit of FIG. 4 is best understood by considering the voltage waveforms shown in FIGS. 5 and 6. These are voltage waveforms of transformer 190 and FIG. 5 corresponds to FIG. 2 for a condition of narrow on-time of transistor 110. FIG. 6 corresponds to FIG. 3 and shows a voltage waveform across transformer 190 for a condition of relatively wide on-time or high duty factor.

The forward voltage waveform of FIG. 5 corresponds to the forward voltage waveform of FIG. 2 and is shown as waveform 208 in FIG. 5 and is identical in every respect to that of FIG. 2. The reverse voltage produced across transformer 190 is somewhat different than that of transformer 92 since this results from the normal flyback action of the transformer. The voltage is carried sharply negative along line 210 by the inductive action of choke 204 although no drive power is flowing into or out of the transformer winding at this time. Upon decay of the inductive effect of choke 204, the voltage falls along line 212 and rings as shown at 214. This ringing results from the blocking characteristics and the minute capacitive leakage of diode 198 as well as the shunt capacity in the windings of transformer 190. Since this condition of the transformer flyback is not driven under power by a tube bank, no saturation results from this form of operation.

FIG. 6 shows a condition of wide on-time, as described above, and the positive waveform of FIG. 6, shown as waveform 216, corresponds to the same waveform of FIG. 3 and is identical in every respect. Upon turn Off of tube 180, the voltage across the transformer during this condition of wide on-time is carried negative by choke 204 and the turn Off characteristic 218 is similar to 210 of FIG. 5. As in all other cases, the flyback area must exactly equal the forward area and area 220 results in flyback voltage peak 222.

By comparing FIGS. 2 and 5 and FIGS. 3 and 6, respectively, it can be seen that there are only minor differences in the voltage waveform across the respective transformers, however, operation of the two circuits is considerably different. The important similarity in operation of the two circuits is that the transistor is sharply turned On under power and more important, it is turned Off under power and after the initial turn Off period is maintained nonconductive by the low voltage bias stored across capacitors 120 or 200 in the respective circuits.

While the two circuits shown relate directly to electrical discharge machining, the important concept of each circuit is the novel transformer coupling network for coupling the pulsating output of a vacuum tube bank to drive a transistor bank. Other pulse circuits requiring efficient coupling of relatively large amounts of power from a vacuum tube pulse amplifier to a transistor power bank could utilize this same drive network, the only difference being that workpiece 128 and electrode 130 comprising the working gap would be replaced by the new load circuit.

In the drawings, the D.C. supplies are shown as batteries in the interest of simplifying the disclosure. In actual practice, these sources of D.C. are derived from the secondary of a transformer having its primary connected to the power source for the machine which may be single phase or polyphase A.C. The secondary voltage is rectified and stored usually in an electrolytic storage capacitor to form a nearly ideal D.C. source having very low internal impedance.

It may thus be seen that I have shown and described a new and improved coupling network for coupling the output of a vacuum tube amplifier to drive a transistor bank in which the coupling network is particularly adapted to pulse circuitry having a wide range of duty factor and pulse repetition rate. By disclosing the above circuitry embodying this invention, it is not intended to limit the scope of the invention to the above disclosure which is given for the purpose of example but only as set forth in the following claims.

I claim:

1. A coupling circuit for connecting drive power from a periodically conductive, vacuum tube amplifier to at least one power transistor, having a base, emitter and collector, said transistor having a load and a power source connected in series across its emitter and collector and operable to receive input signals across its emitter and base comprising, a pluse transformer having its primary operatively connected to the output of said amplifier and its secondary connected across said base and emitter of said transistor, an inductance connected across said secondary for accelerating turn OFF of said transistor, and a biasing means connected in series with said secondary for maintaining said transistor nonconductive for a selected time duration after turn OFF signal.

2. The combination as set forth in claim 1 in which said biasing means is self-developed by drive current and comprises at least one semiconductor rectifier connected in parallel with a capacitor.

3. The combination as set forth in claim 1 in which a parallel resistor-capacitor network is connected in series with said primary for accelerating turn ON of said transistor.

4. The combination as set forth in claim 1 in which a rectifier is connected in series with said secondary for blocking flyback voltage.

5. A coupling circuit for connecting drive power from a periodically pulsed, push-pull, vacuum tube amplifier to at least one power transistor having a base emitter and collector, said transistor having a load and a power source serially connected across its emitter and collector and operable to receive an output signal from said amplifier across its emitter and base comprising, a stepdown transformer having its primary connected to the output of said amplifier and its secondary connected across said base and emitter of said transistor, said amplifier operable to pulse said primary with voltages of opposite polarity to provide alternate turn ON and turn OFF signals to said transistor, and a biasing means in series with said secondary for maintaining said transistor nonconductive for a selected time duration after its turn OFF.

6. The combination as set forth in claim 5 in which a parallel resistor-capacitor network is connected in series with said primary for accelerating turn ON of said transistor.

7. The combination as set forth in claim 5 in which said biasing means is self-developed by drive current and comprises a capacitor shunted by at least one semiconductor rectifier.

8. The combination as set forth in claim 5 in which said vacuum tube amplifier includes a pair of tubes, each having its principal electrodes operatively connected to a different end of said primary, and a tap of said primary is connected to one terminal of a source of excitation voltage, one of said tubes operable to provide a turn ON signal during its conduction and the other of said tubes operable to provide a turn OFF signal during its conduction.

9. The combination as set forth in claim 8 in which said tubes have an on-off ratio variable over a wide range and in which said tube conductive during the turn ON signal is conductive for a relatively shorter time duration than said tube conductive during the turn OFF signal.

10. The combination as set forth in claim 9 in which said transformer saturates during the turn OFF signal and prior to turn ON signal.

11. The combination as set forth in claim 8 in which said tubes have an on-off ratio variable over a wide range and in which said tube conductive during the turn ON signal is conductive for a relatively longer time duration than said tube conductive during the turn OFF signal.

12. The combination as set forth in claim 11 in which a parallel resistor-capacitor-network shunted by a diode phased to conduct drive current is connected in series with said secondary to limit reverse current through said transistor during OFF time and to prevent saturation of said transformer during ON time.

13. A coupling transformer stage between a periodically pulsed vacuum tube amplifier and at least one power transistor having a load and a power source serially connected across its principal electrodes comprising a transformer having its primary connected to the output of said amplifier and its secondary connected across the control electrode and one of said principal electrodes of said transistor for rendering it alternately conductive and nonconductive and a self-developing biasing means connected in series with said secondary for maintaining said transistor nonconductive for a selected time duration subsequent to its being rendered conductive.

14. The combination as set forth in claim 13 in which said biasing means comprises a semiconductor diode and a parallel connected capacitor.

15. The combination as set forth in claim 14 in which a parallel resistor-capacitor network is connected in series with said primary for accelerating the change of state of said transistor from nonconductive to conductive.

16. The combination as set forth in claim 13 in which said transformer is a pulse transformer and an inductance is connected across said secondary for accelerating the change of state of said transistor from conductive to nonconductive.

17. The combination as set forth in claim 13 in which said amplifier includes a pair of tubes connected to said primary in push-pull relationship and said transistor is driven conductive and nonconductive under power.

18. The combination as set forth in claim 14 in which said transistor is driven conductive for a longer time period than it is driven nonconductive and a parallel resistor-capacitor network shunted by a diode phased to conduct drive current is connected in series with said secondary to limit reverse current through said transistor during its nonconductive period and to prevent saturation of said transformer during the conductive period of said transistor.

19. An electronic circuit for providing unidirectional power pulses of sharp turn ON and turn OFF characteristics across a load comprising, a multivibrator biased to provide a pulsating output, a vacuum tube amplifier operatively connected to said multivibrator for amplifying its pulsating output, at least one power transistor having a base, emitter and collector, said transistor having its emitter and collector connected across the load and a serially connected power supply, said transistor operable to receive opposite polarity turn ON and turn OFF signals across its emitter and base, a pulse transformer of the step down type having its primary connected in the output circuit of said amplifier and its secondary connected across said emitter and base to provide turn ON signals to said transistor, an inductance connected across said secondary for accelerating turn OFF of said transistor, and a self-developing direct current biasing means connected in series with said secondary and operable to maintain said transistor nonconductive for a selected time duration subsequent to turn OFF.

20. The combination as set forth in claim 19 in which said direct current biasing means comprises at least one semiconductor rectifier connected in parallel with a capacitor.

21. The combination as set forth in claim 19 in which a parallel resistor-capacitor network is connected in series with said primary for accelerating turn ON of said transistor.

22. An electronic circuit for providing unidirectional power pulses of sharp turn ON and turn OFF characteristics across a load comprising, a multivibrator biased to provide a pulsating out-put, an amplifier operatively connected to said multivibrator for amplifying its pulsating output, said amplifier including a first and a second electronic tube, a transformer having its primary connected to said tubes for push-pull operation, at least one power transistor having its principal electrodes connected across the load and a serially connected power source, said transformer having its secondary connected across one of said principal electrodes and the control electrode of said transistor for providing alternate turn ON and turn OFF signals thereto, and a self-developing direct current biasing means connected in series with said secondary for maintaining said transistor nonconductive for a selected time duration subsequent to turn OFF signal.

23. The combination as set forth in claim 22 in which said biasing means comprises at least one semiconductor rectifier and a capacitor connected in parallel.

24. The combination as set forth in claim 22 in which a parallel resistor-capacitor network is connected in series with said primary and the principal electrodes of one of said tubes for accelerating the turn ON of said transistor.

25. The combination as set forth in claim 22 in which said transistor is of the PNP type having said secondary connected across its base and emitter electrodes and the load connected across its emitter and collector in common emitter relationship.

26. An electrical discharge machining circuit for machining a conductive workpiece by intermittent electrical discharge from an electrode tool across a dielectric filled gap comprising, a pulse generator adjustable to provide a pulsating output over a broad range of duty factor, an amplifier for increasing the strength of the pulsating output of said pulse generator, said amplifier including a pair of electronic tubes alternately conductive responsive to the pulsating output of said pulse generator, a transformer having its primary connected to said tubes for push-pull operation, and at least one power transistor having its principal electrodes connected across a serially connected source of machining power and said gap, said transformer having its secondary connected across one of said principal electrodes and the control electrode of said transistor for providing alternate turn ON and turn OFF signals thereto.

27. The combination as set forth in claim 26 in which said tube conductive during the turn ON signal is conductive for a relatively shorter time duration than said tube conductive during the turn OFF signal and said transformer saturates during the turn OFF signal.

28. The combination as set forth in claim 26 in which a biasing means self-developed by drive current is connected in series with said secondary for maintaining said transistor non-conductive for a selected time duration after turn OFF signal.

29. The combination as set forth in claim 28 in which said biasing means comprises at least one semiconductor rectifier connected in parallel with a capacitor.

30. The combination as set forth in claim 29 in which said tube conductive during the turn ON signal is conductive for a relatively longer time duration than said tube conductive during the turn OFF signal and a parallel resistor-capacitor network shunted by a diode phased to conduct drive current is connected in series with said secondary to limit reverse current through said transistor during OFF time and to prevent saturation of said transformer during ON time.

31. The combination as set forth in claim 26 in which said transistor is embodied as a PNP transistor having said secondary connected across its base and emitter and having its emitter and collector connected across said gap.

32. The combination as set forth in claim 26 in which a parallel resistor-capacitor network is connected in series with said primary for accelerating turn ON of said transistor.

33. The combination as set forth in claim 26 in which said pulse generator comprises an astable multivibrator including a pair of electronic tubes biased for alternate operation and having their control grids connected through a common rheostat for selective adjustment of duty factor.

34. An electrical discharge machining circuit for machining a conductive workpiece by intermittent electrical discharge from an electrode tool across a dielectric filled gap comprising, a pulse generator adjustable to provide a pulsating output over a broad range of duty factor, an amplifier for increasing the strength of the pulsating output of said pulse generator, a pulse transformer having its primary operatively connected to the output of said amplifier, at least one power transistor having its principal electrodes connected across said gap and a serially connected source of machining power, said transformer having its secondary connected across one of said principal electrodes and the control electrode of said transistor for providing alternate turn ON and turn OFF signals thereto, and an inductance connected across said secondary for accelerating turn OFF of said transistor.

35. The combination as set forth in claim 34 in which a biasing means is connected in series with said secondary for maintaining said transistor nonconductive for a selected time duration after turn OFF signal.

36. The combination as set forth in claim 35 in which said biasing means is self developed by drive current and comprises at least one semiconductor rectifier connected in parallel with a capacitor.

37. The combination as set forth in claim 34 in which a parallel resistor-capacitor network is connected in series with said primary for accelerating turn ON of said transistor.

38. The combination as set forth in claim 34 in which said transistor is embodied as a PNP transistor having said secondary connected across its base and emitter and having its emitter and collector connected across said gap.

References Cited in the file of this patent

UNITED STATES PATENTS

| | | |
|---|---|---|
| 2,644,893 | Gehman | July 7, 1953 |
| 3,089,059 | Porterfield | May 7, 1963 |